March 12, 1940.  V. F. ANTOINE  2,193,156
ARTICULATED VEHICLE CONSTRUCTION
Filed March 17, 1939   3 Sheets-Sheet 1
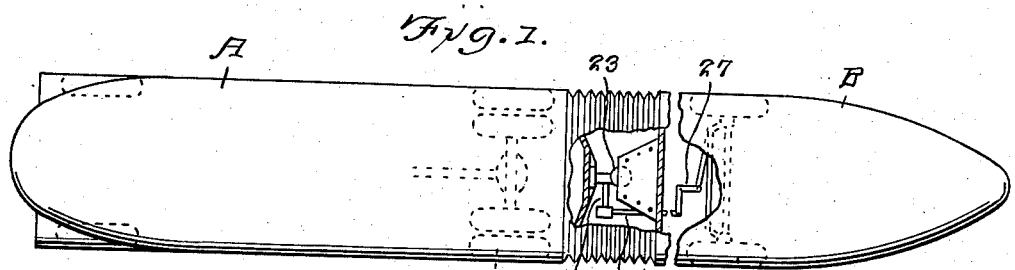
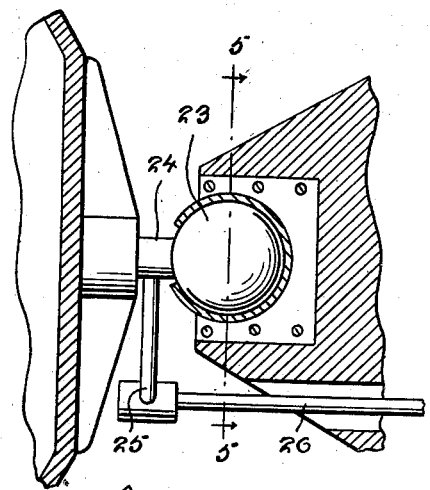
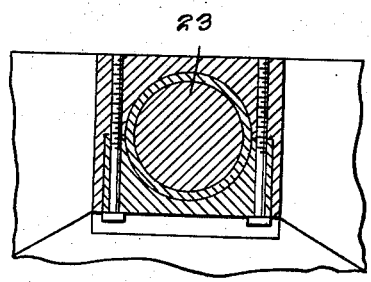
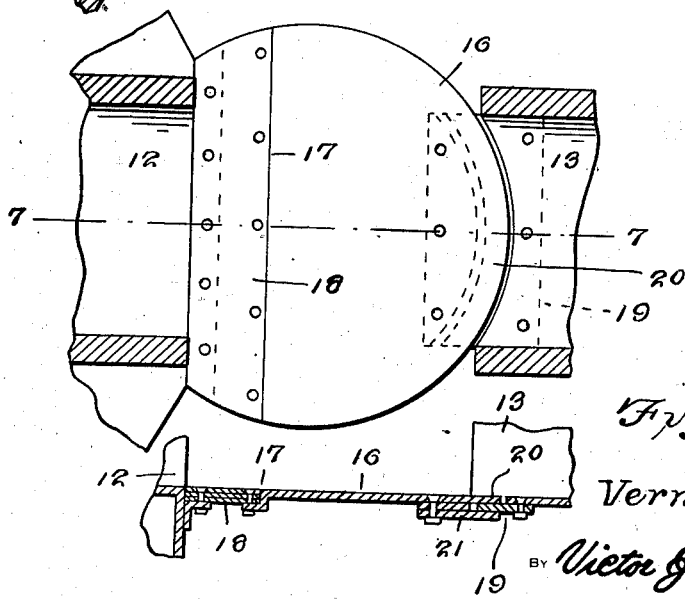
Vernon F. Antoine
INVENTOR
BY Victor J. Evans & Co.
ATTORNEYS March 12, 1940.  V. F. ANTOINE  2,193,156
ARTICULATED VEHICLE CONSTRUCTION
Filed March 17, 1939   3 Sheets-Sheet 2
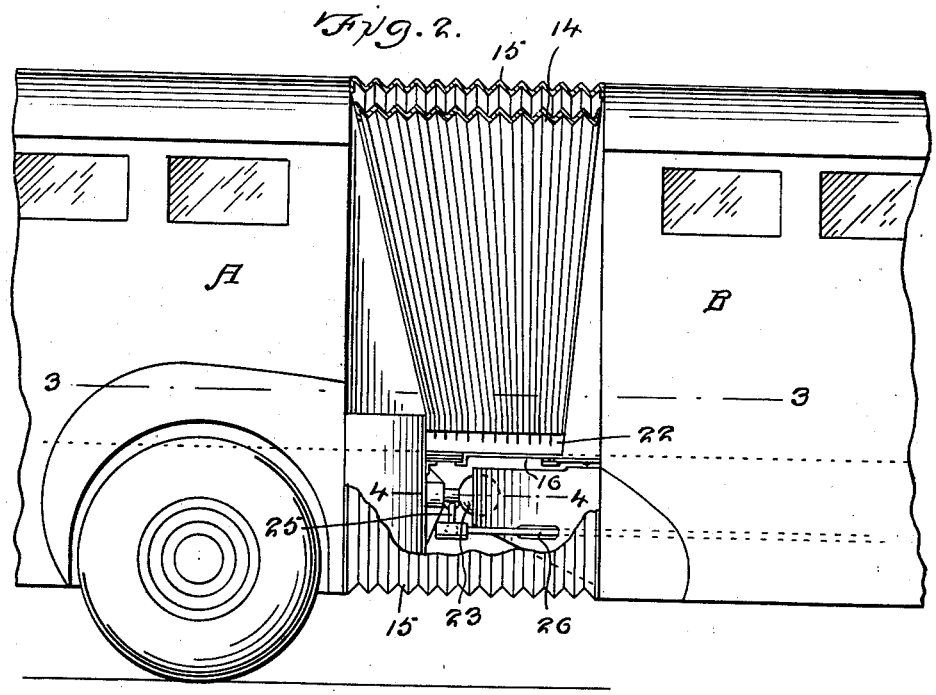
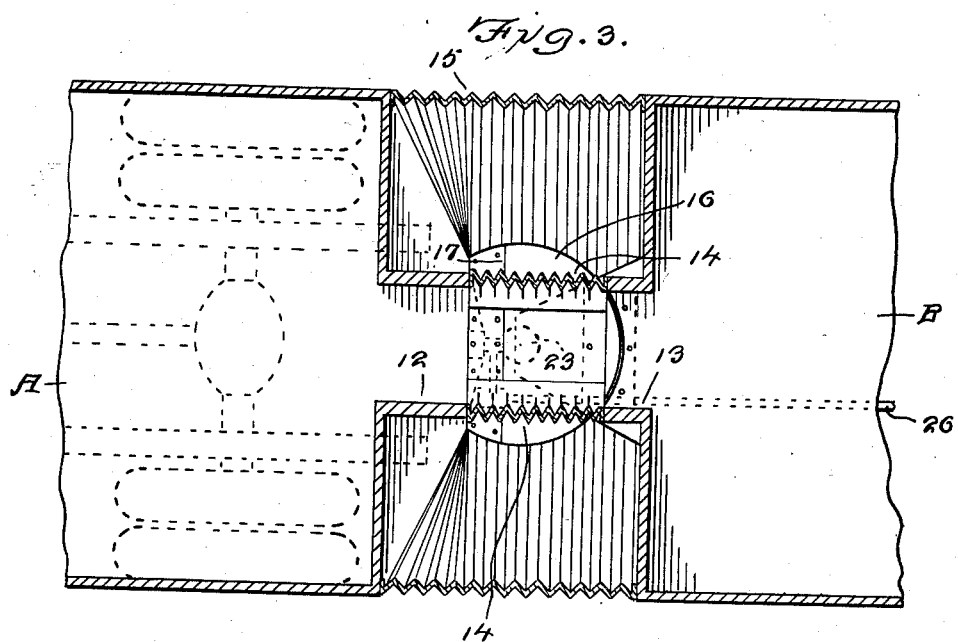
Vernon F. Antoine
INVENTOR
BY Victor J. Evans & Co.
ATTORNEYS March 12, 1940.　　　V. F. ANTOINE　　　2,193,156
ARTICULATED VEHICLE CONSTRUCTION
Filed March 17, 1939　　　3 Sheets-Sheet 3
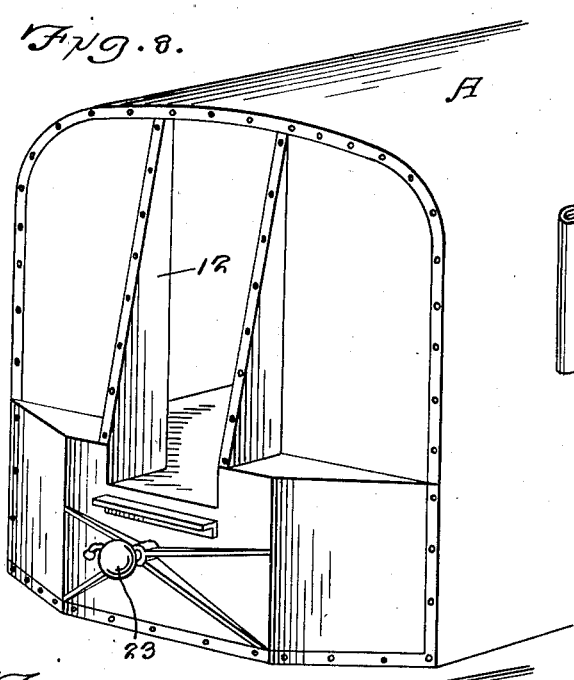
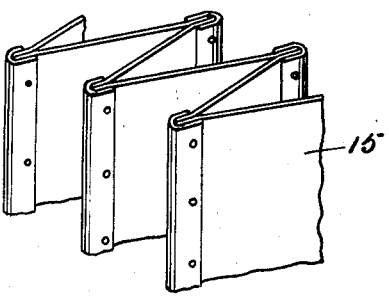
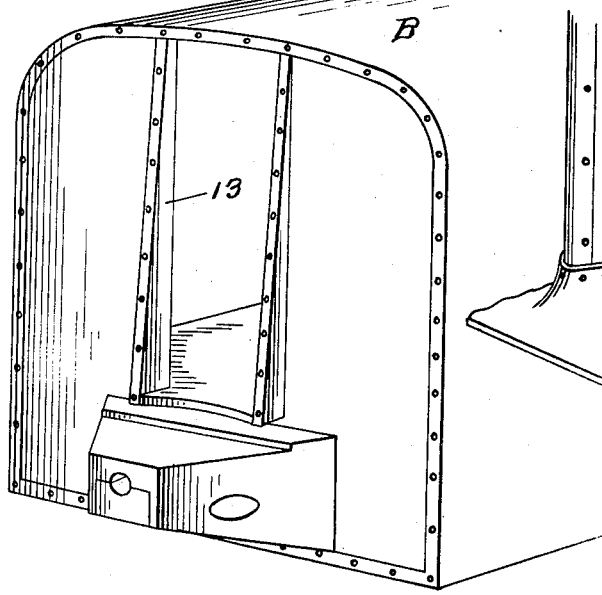
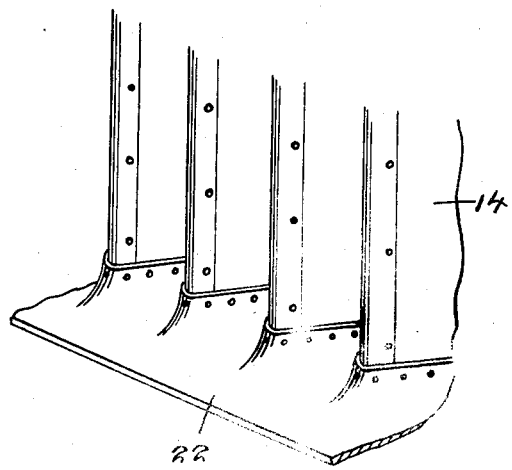
Vernon F. Antoine
INVENTOR
BY Victor J. Evans & Co.
ATTORNEYS Patented Mar. 12, 1940

2,193,156

UNITED STATES PATENT OFFICE 2,193,156

ARTICULATED VEHICLE CONSTRUCTION

Vernon F. Antoine, Anaconda, Mont.

Application March 17, 1939, Serial No. 262,537

3 Claims. (Cl. 280—33)

Reference is directed to the accompanying drawings, which disclose the preferred embodiment of the invention; however, it is to be understood that the invention is not limited to the exact details of construction shown and described, as variations and modifications and changes may be made therein as fall within the scope of the claims hereunto.

In the accompanying drawings:

Figure 1 is a top plan view of a vehicle construction in accordance with the invention, being partly in section.

Figure 2 is an enlarged side elevation, partly in section.

Figure 3 is a sectional view taken on the line 3—3 of Figure 2.

Figure 4 is a sectional view on the line 4—4 of Figure 2.

Figure 5 is a sectional view on the line 5—5 of Figure 4 looking in the direction of the arrows.

Figure 6 is a fragmentary horizontal sectional view showing a tread plate arrangement.

Figure 7 is a sectional view on the line 7—7 of Figure 6.

Figure 8 is a fragmentary perspective view of one of the bodies of the vehicle.

Figure 9 is a perspective view of the other body of the vehicle.

Figure 10 is a fragmentary perspective view showing the vestibule diaphragm.

Figure 11 is a fragmentary perspective view of another portion of said diaphragm.

The primary object of the invention is the provision of an articulated vehicle construction, wherein a main body and a trailing body are joined so that access can be had therebetween with perfect safety and the trailing body will follow the main body in the travel of the vehicle, the vestibule diaphragm being of novel construction and is fitted between the bodies and therewith in a unique manner.

Another object of the invention is the provision of a vehicle construction of this character, wherein the coupling between the articulated bodies causes the trailing body to track with relation to the main body in a manner that will permit of the vehicle taking curves of a small radius and both bodies will be susceptible of free flexing allowing the trailing body to travel uneven ground in its association with the main body of such vehicle.

As shown in the drawings, the invention is illustrated applied to an articulated vehicle construction, comprising a plurality of bodies A and B, respectively, the latter being the trailing body supported upon steering wheels 10, the driving wheels 11 for the forward or other body A being arranged aft thereof, as is usual. These bodies A and B have at their adjacent ends doorways 12 and 13, respectively, the frames of which have permanently attached thereto an accordion pleated flexible vestibule diaphragm 14 while permanently attached to the ends adjacent to each other of the said bodies A and B is an outer accordion pleated flexible incasing diaphragm 15. Bridging the gap between the adjacent ends of the bodies A and B and constituting a flooring for the vestibule diaphragm 14 is a turnable sill plate 16 for the doorways constituted by the frames 12 and 13. This plate 16 is in the form of a partially circular body having a straight edge 17 joined with a resilient flexible section 18 which is also fixed to the sill of the door frame 12 while the sill 19 of the door frame 13 is interfitted with the said plate 16 for relative swinging movements, the interfitting being had by an overlap 20 and an underlap 21, respectively, between the said plate 16 and the sill 19. This plate 16 assures safety to persons passing through the vestibule diaphragm 14 between the bodies A and B in making entrance and exit to and from the same.

The sides of the diaphragm 14 are formed with overlapping flaps 22 which are free from and extend over the plate 16 to assure a closed fitting therebetween.

The outer diaphragm 15 assures a sealing enclosure entirely about the vestibule diaphragm 14 to exclude weather elements therefrom.

The flexible section 18 joined with the plate 16 compensates for twisting at the joint between the bodies A and B due to road irregularities in the travel of the vehicle.

Connecting at the longitudinal axis of the vehicle the two bodies A and B together is a ball and socket coupling 23. The ball member stem 24 thereof has a laterally extending arm 25 connected by a drag link 26 operating a steering hookup 27 with the steering wheels 10 of the trailer body B so that when the fore body A in its lead to the trailer body B, when the vehicle is traveling, takes a curve, the steering wheels 10 supporting the body B will be automatically steered so that this body B will turn concurrently with the turning of the body A and enabling the vehicle to make a curve of small radius.

The coupling and the connections with the steering hookup with the steering wheels 10 of the body B are incased by the diaphragm 15 and protected against weather elements.

The steering of the front body A effects the automatic steering of the rear body B allowing the trailer wheels 10 to pass in the tracks approximately centrally of the tracks of the driving wheels 11 with the result that the vehicle can make sharp turns and also travel in a minimum path when turning corners.

What is claimed is:

1. A structure of the kind described for relatively movable bodies coupled with each other, comprising flexible inner and outer diaphragms between and attached to the said body with the coupling between the latter arranged between said diaphragms, the inner diaphragm establishing communication between said bodies, a turnable sill plate arranged between the bodies and at the lowermost portion of the inner diaphragm and having straight and circular edges, a resilient flexible section joined with the straight edge of said plate and one of said bodies, a sill on the other body and overlapped by said plate, and an underlap piece for the said last-mentioned sill and carried by said plate for the turnable fitting of the latter with the last-mentioned sill.

2. A structure of the kind described for relatively movable bodies coupled with each other, comprising flexible inner and outer diaphragms between and attached to the said body with the coupling between the latter arranged between said diaphragms, the inner diaphragm establishing communication between said bodies, a turnable sill plate arranged between the bodies and at the lowermost portion of the inner diaphragm and having straight and circular edges, a resilient flexible section joined with the straight edge of said plate and one of said bodies, a sill on the other body and overlapped by said plate, an underlap piece for the said last-mentioned sill and carried by said plate for the turnable fitting of the latter with the last-mentioned sill, and pleated formations created in the said diaphragms.

3. A structure of the kind described for relatively movable bodies coupled with each other, comprising flexible inner and outer diaphragms between and attached to the said body with the coupling between the latter arranged between said diaphragms, the inner diaphragm establishing communication between said bodies, a turnable sill plate arranged between the bodies and at the lowermost portion of the inner diaphragm and having straight and circular edges, a resilient flexible section joined with the straight edge of said plate and one of said bodies, a sill on the other body and overlapped by said plate, an underlap piece for the said last-mentioned sill and carried by said plate for the turnable fitting of the latter with the last-mentioned sill, and pleated formations created in the said diaphragms, the said outer diaphragm being a sealing enclosure for the inner diaphragm and the coupling between the bodies.

VERNON F. ANTOINE.